United States Patent
Park

(10) Patent No.: US 7,080,618 B2
(45) Date of Patent: Jul. 25, 2006

(54) VARIABLE INTAKE SYSTEM OF A VEHICLE

(75) Inventor: Dae Sung Park, Suwon (KR)

(73) Assignee: Hyundai Motor Company and Kia Motors Corporation, Seoul (KR)

( * ) Notice: Subject to any disclaimer, the term of this patent is extended or adjusted under 35 U.S.C. 154(b) by 0 days.

(21) Appl. No.: 11/028,271

(22) Filed: Dec. 30, 2004

(65) Prior Publication Data

US 2005/0279312 A1    Dec. 22, 2005

(30) Foreign Application Priority Data

Jun. 21, 2004   (KR) .................... 10-2004-0046110

(51) Int. Cl.
*F02M 35/10* (2006.01)
(52) U.S. Cl. ................................. 123/184.55
(58) Field of Classification Search ............ 123/184.55
See application file for complete search history.

(56) References Cited

U.S. PATENT DOCUMENTS

| 4,679,531 A | * | 7/1987 | Hitomi et al. ......... 123/184.55 |
| 4,690,106 A | * | 9/1987 | Nakayama et al. .... 123/184.55 |
| 5,033,417 A | * | 7/1991 | van Basshuysen et al. ...... 123/184.55 |
| 2003/0200949 A1 | * | 10/2003 | Bochum et al. ....... 123/184.55 |

FOREIGN PATENT DOCUMENTS

| JP | 03172533 A | * | 7/1991 |
| JP | 2000-274321 | | 10/2000 |

* cited by examiner

*Primary Examiner*—Noah P. Kamen
(74) *Attorney, Agent, or Firm*—Morgan Lewis & Bockius LLP

(57) ABSTRACT

A variable intake system of a vehicle includes a plenum into which an external air is flowed, an intake manifold comprising a plurality of runners connected with the plenum and respectively guiding the air of the plenum into a plurality of cylinders, and a varying unit controlling a length of the runners according to a vehicle driving condition.

3 Claims, 4 Drawing Sheets

VARIABLE INTAKE SYSTEM OF A VEHICLE

CROSS REFERENCE TO RELATED APPLICATIONS

This application is based on, and claims priority to, Korean Application No. 10-2004-0046110, filed on Jun. 21, 2004, the disclosure of which is hereby incorporated by reference.

FIELD

The present invention relates to an intake system of a vehicle. More particularly, the present invention relates to a variable intake system of a vehicle.

BACKGROUND

Generally, an intake system of a vehicle is to flow air into a cylinder, and includes a plenum, and an intake manifold. The plenum is where external air flows in from outside. The intake manifold has a runner for guiding the air of the plenum into the cylinder. When an engine's rpm is high, it is preferable that a length of the runner of the intake manifold is short, and when the engine's rpm is low, it is preferable that a length of the runner of the intake manifold becomes long. A system that controls the length of the runner based on engine rpm is usually called a variable intake system (VIS). However, existing variable intake systems have a number of drawbacks, including the loss of flow pressure or velocity within parts of the system. Such systems are also too large.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a variable intake system of a vehicle having non-limiting advantages of an enhanced flow pressure, an enhanced flow velocity, and an enhanced system layout.

An exemplary variable intake system of a vehicle according to an embodiment of the present invention includes: a plenum into which an external air is flowed; an intake manifold including a plurality of runners connected with the plenum and respectively guiding the air of the plenum into a plurality of cylinders; and a varying unit controlling a length of the runners according to a vehicle driving condition, wherein the varying unit includes: at least one connecting part interconnecting the plenum and the intake manifold, and having a plurality of guide passages for distributing the air from the plenum to the intake manifold; and at least one opening/closing part disposed on the connecting part so as to selectively open/close the plurality of guide passages, wherein the guide passages are respectively tilted at a predetermined angle.

In a further embodiment according to the present invention, the at least one connecting part includes a first connecting part disposed on an upper portion of the plenum; and wherein the at least one opening/closing part includes a first opening/closing part disposed on the first connecting part.

In another further embodiment according to the present invention, the at least one connecting part includes a second connecting part disposed on a lower portion of the plenum; and wherein the at least one opening/closing part includes a second opening/closing part disposed on the second connecting part.

In another further embodiment according to the present invention, the at least one opening/closing part includes: a driving shaft pivotally disposed on the connecting part; and a plurality of valves disposed on the driving shaft so as to respectively open/close the plurality of guide passages.

In another further embodiment according to the present invention, the predetermined angle of each of the guide passages is 24±1° with respect to a horizontal line of the plenum.

BRIEF DESCRIPTION OF THE DRAWINGS

The accompanying drawings illustrate exemplary embodiments of the present invention, and, together with the description, serve to explain the principles of the present invention, wherein.

DETAILED DESCRIPTION OF THE EMBODIMENTS

An embodiment of the present invention will hereinafter be described in detail with reference to the accompanying drawings.

Figure 1:
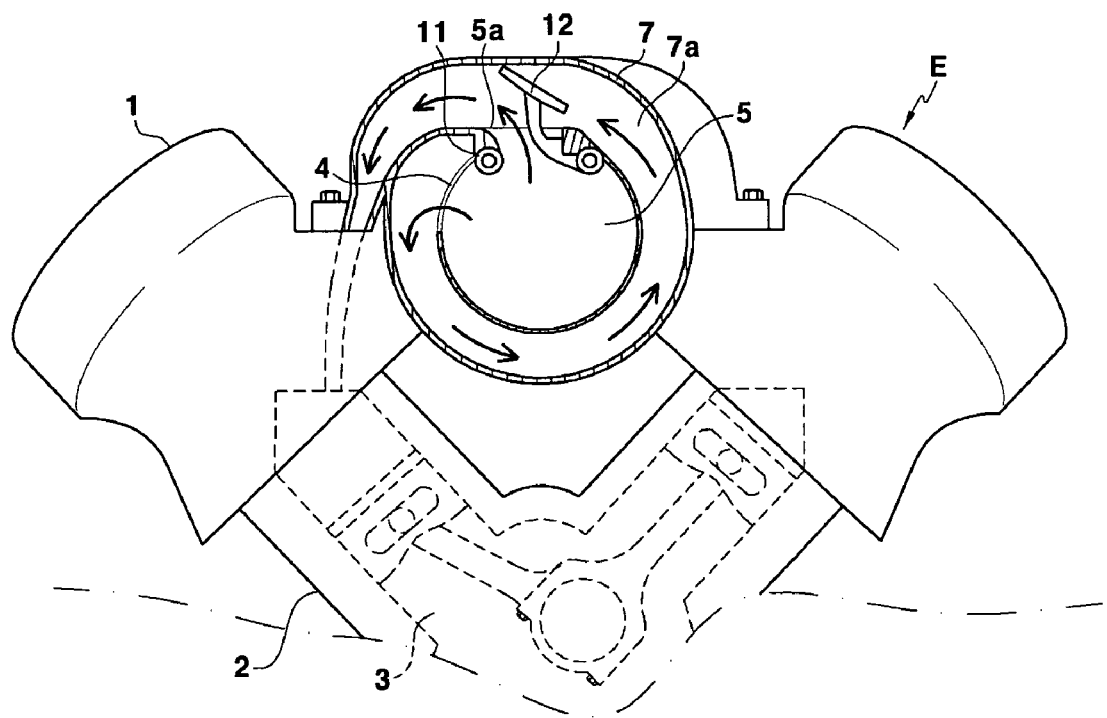
FIG. 1 is a vertical sectional view showing principal parts of a variable intake system of a vehicle mounted to a cylinder head.

Generally, as shown in FIG. 1, the function of an intake system of a vehicle is to inject air into a cylinder 3. An intake system includes a plenum 5, and an intake manifold 7. The plenum 5 injects external air into the intake system. The intake manifold 7 has a runner 7a for guiding the air of the plenum 5 into the cylinder 3. A connecting passage 4 for connecting the plenum 5 and the intake manifold 7 is formed at an end of the intake manifold 7. As mentioned above, it is advantageous if a length of the runner 7a of the intake manifold 7 is varied according to a vehicle driving condition. That is, when an engine rpm is high, it is preferable that a length of the runner 7a of the intake manifold 7 becomes short. When an engine rpm is low, it is preferable that a length of the runner 7a of the intake manifold 7 becomes long.

Typical variable intake systems include a passing hole 5a and one or two opening/shutting part(s) 11 or 12. The passing hole 5a is formed at an upper portion of the plenum 5 so as to interconnect the plenum 5 and the intake manifold 7, and the opening/shutting part 11 (or 12) is disposed on the passing hole 5a.

Accordingly, the length of the runner 7a becomes variable, since the passing hole 5a is opened and closed by the opening/shutting part 11 or 12 based on vehicle travel speed. That is, when the vehicle travel speed is high, as shown in FIG. 1, since the passing hole 5a is opened, the length of the runner 7a becomes short. Therefore, in the intake manifold 7, the air that passes through the passing hole 5a is mixed with the air that has passed through the connecting passage 4. When the vehicle travel speed is low, the length of the runner 7a becomes long, since the passing hole 5a is closed and only the air that has passed through the connecting passage 4 flows into the intake manifold 7. However, when the air of the plenum 5 flows into the intake manifold 7 through the passing hole 5a, the conventional variable intake system has a problem that a flow pressure and/or a flow velocity are/is lowered, since the air has to rapidly turn almost 90°. In addition, if the two opening/closing parts 11 and 12 are disposed on the passing hole 5a, the size of the intake system becomes excessively big since much space is required by the system in an aspect of a layout.

Figure 2:
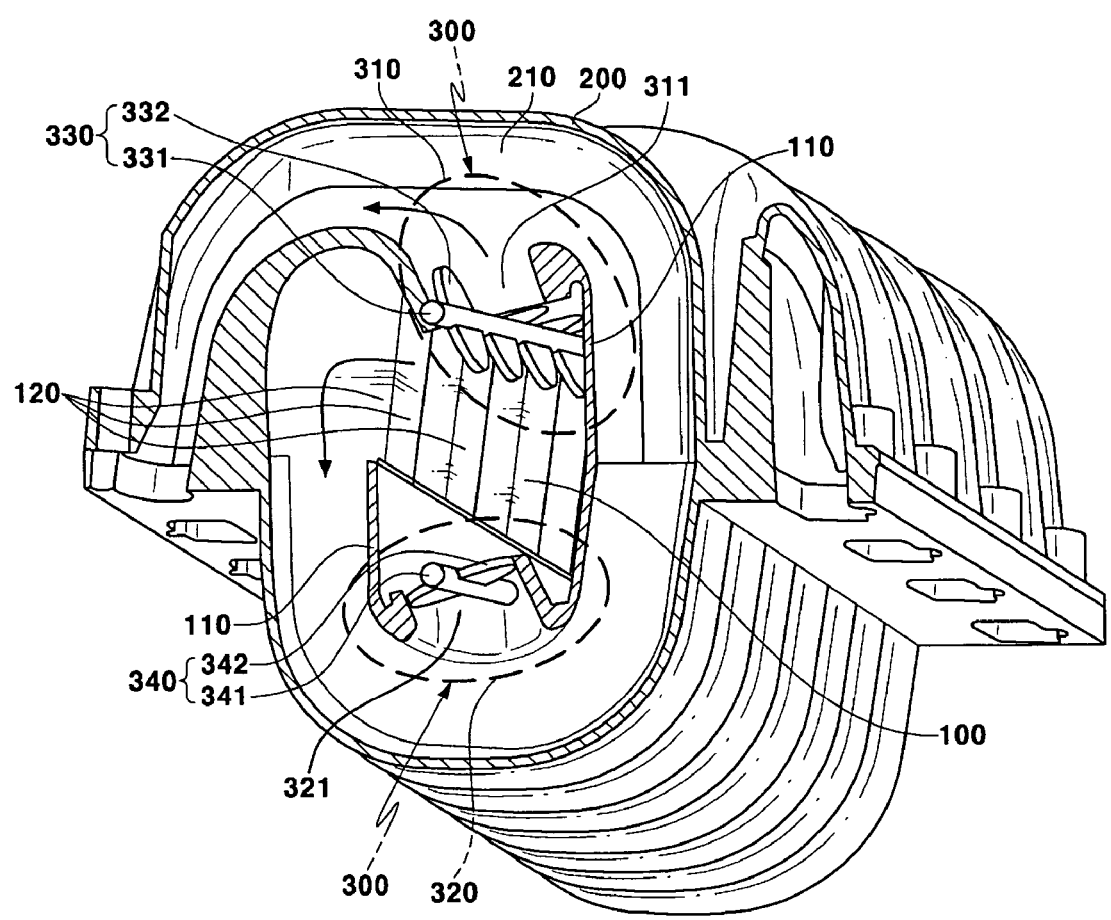
FIG. 2 is a cutaway view in perspective of a variable intake system of a vehicle according to an embodiment of the present invention.
Figure 3:
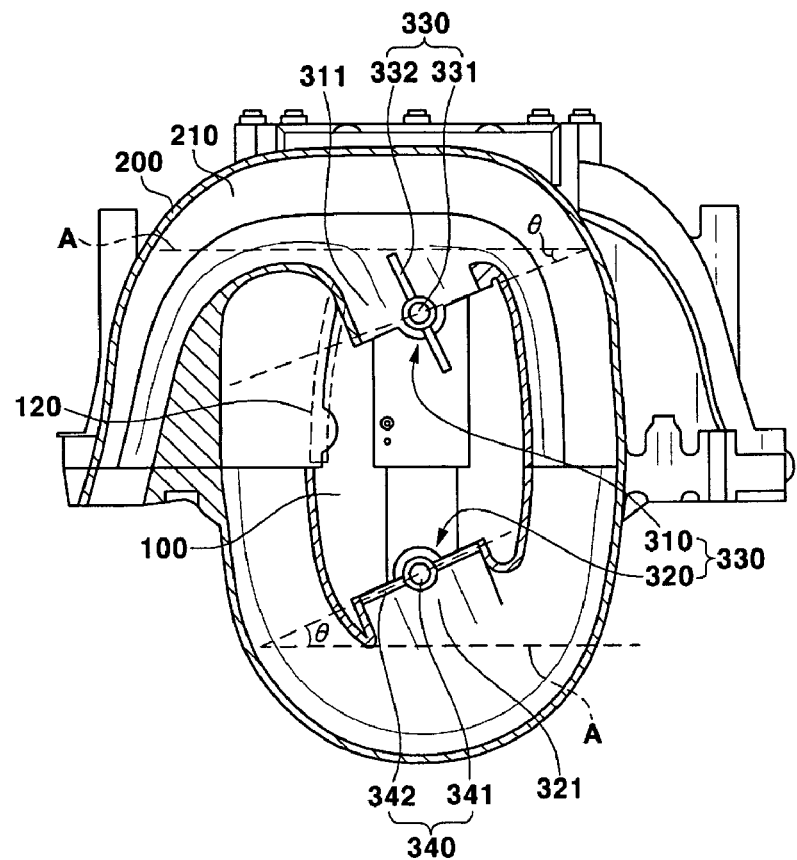
FIG. 3 is a front view showing the variable intake system of a vehicle according to an embodiment of the present invention.

FIG. 2 is a cutaway view in perspective of a variable intake system of a vehicle according to an embodiment of the present invention; and FIG. 3 is a front view showing the variable intake system of a vehicle according to an embodiment of the present invention. As shown in FIGS. 2 and 3, a variable intake system of a vehicle injects external air into a plurality of cylinders (see "3" in FIG. 1), and includes a plenum 100, an intake manifold 200, and a varying unit 300. The plenum 100 temporally stores air flowing in from outside.

The intake manifold 200 includes a plurality of runners 210 connected with the plenum 100, and respectively guides the air of the plenum 100 into the plurality of cylinders 3. The varying unit 300 differently controls each length of the runners 210 according to driving conditions.

The plurality of cylinders 3 may be arranged such that four cylinders are formed on each of the left and right banks of a cylinder block (see "2" in FIG. 1). Alternatively, three cylinders (instead of four) may be formed on each of the left and right banks of the cylinder block 2. However, it should be understood that the present invention is not limited to the number of cylinders formed at each bank.

A variable intake system of a vehicle according to the embodiment of the present invention will hereinafter be described in detail.

The intake manifold 200 is preferably formed in a shape that tightly surrounds the plenum 100 so that the volume occupied by a variable intake system may be reduced. In the case that the intake manifold 200 is structured in such a manner, it is preferable that the intake manifold 200 and the plenum 100 are partitioned by a single wall 110.

The varying unit 300 includes: at least one connecting part (see "310") having a plurality of guide passages (see "311"); and an opening/closing part (see "330") disposed on the connecting part. Furthermore, it is preferable that the at least one connecting part includes a first connecting part 310 provided to an upper portion of the plenum 100, such that the length of the runners 210 is minimized when the vehicle travel speed is high.

The first connecting part 310 includes a plurality of first guide passages 311. Particularly, each of the first guide passages 311 connects the plenum 100 and each runner 210 of the intake manifold 200, such that the air is distributed from the plenum 100 into each runner 210.

In addition, it is more preferable that the at least one connecting part further includes a second connecting part 320 provided to a lower portion of the plenum 100, such that the length of the runners 210 is finely varied according to the vehicle driving condition. The second connecting part 320 includes a plurality of second guide passages 321. Particularly, each of the second guide passages 321 connects the plenum 100 and each runner 210 of the intake manifold 200, such that the air is distributed from the plenum 100 into each runner 210.

In addition, as shown in FIG. 3, it is preferable that the first and second guide passages 311 and 321 are respectively tilted at a predetermined angle (θ), such that the air of the plenum 100 is smoothly flowed into the runners 210 of the intake manifold 200. Particularly, as shown in FIG. 3, it is preferable that the first and second guide passages 311 and 321 are respectively tilted at 24±1° with respect to a horizontal line A of the plenum 100.

The angle 24±1° is a critical value obtained as an experimental result. A flow velocity and a flow pressure of the air were observed to be most preferably enhanced at the angle 24±1°. For example, when the predetermined angle of the first and second guide passages 311 and 321 is less than the critical value, the flow velocity and the flow pressure have been found to rapidly lower. When the predetermined angle thereof is more than the critical value, the variable intake system of a vehicle according to the embodiment of the present invention becomes difficult to fabricate because of a lack of space. On the other hand, as shown in FIG. 2, the opening/closing parts include the first and second opening/closing parts 330 and 340. The first and second opening/closing parts 330 and 340 are respectively disposed on the first and second connecting parts 310 and 320 in order to selectively open/close the first and second guide passages 311 and 321.

Figure 4:
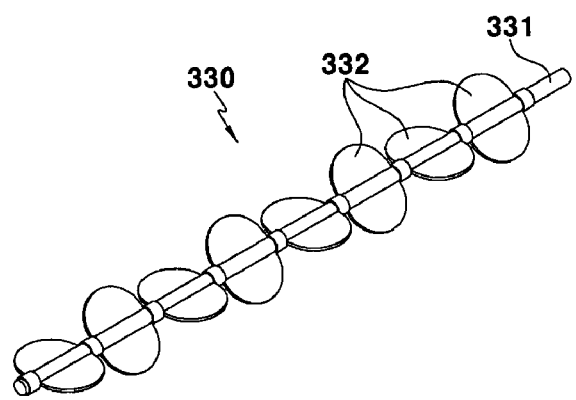
FIG. 4 is a perspective view showing a first opening/closing part, in the variable intake system of a vehicle according to an embodiment of the present invention.

FIG. 4 is a perspective view showing a first opening/closing part, in the variable intake system of a vehicle according to an embodiment of the present invention. As shown in FIGS. 2 and 4, the first opening/closing part is provided with a first driving shaft 331 and a plurality of first valves 332.

As shown in FIG. 2, the second opening/closing part is provided with a second driving shaft 341 and a plurality of second valves 342. For example, as shown in FIGS. 2 to 4, the first and second driving shafts 331 and 341 are pivotally disposed on the first and second connecting parts 310 and 320. Furthermore, it is preferable the first and second driving shafts 331 and 341 are respectively disposed on the first and second connecting parts 310 and 320 one by one, such that the variable intake system according to the embodiment of the present invention may be more enhanced in an aspect of a layout.

As shown in FIGS. 2 to 4, the plurality of first valves 332 are respectively disposed on the plurality of first guide passages 311. As shown in FIGS. 2 to 3, the plurality of second valves 342 is respectively disposed on the plurality of second guide passages 321.

Figure 5:
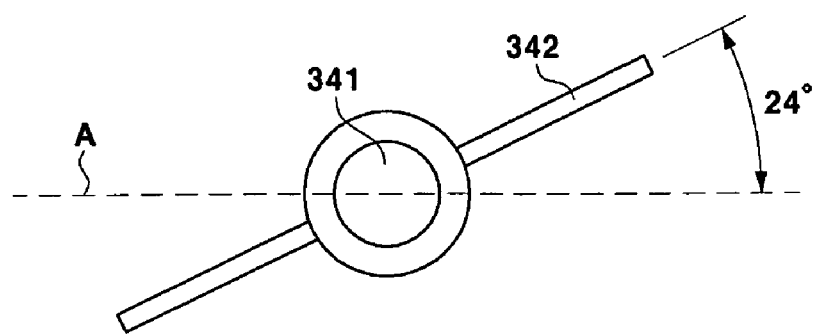
FIG. 5 is a principal part view of FIG. 3 showing a state that a valve is closed.
Figure 6:
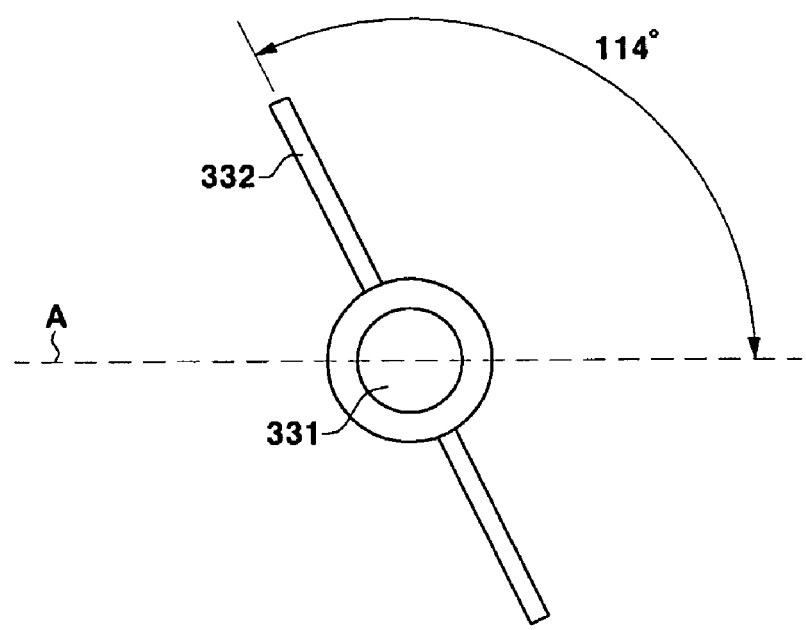
FIG. 6 is a principal part view of FIG. 3 showing a state that the valve is opened.

An operation of the variable intake system of a vehicle according to an embodiment of the present invention will hereinafter be described in detail with reference to FIGS. 3 to 6. FIG. 5 is a principal part view of FIG. 3 showing a state where the valve is closed, and FIG. 6 is a principal part view of FIG. 3 showing a state where the valve is opened.

Firstly, when a vehicle travel speed is high, as shown in FIGS. 2 and 5, the second valve 341 is rotated by the second driving shaft 342 so as to lie at an angle of 24° with respect to a horizontal line A of the plenum 100, and accordingly, it closes the second guide passage 321 of the second connecting part 320. At that same time, as shown in FIGS. 3 and 6, the first valve 332 is rotated by the first driving shaft 331 so as to lie at angle of 114° with respect to a horizontal line A of the plenum 100, and it widely opens the first guide passage 311 of the first connecting part 310.

Accordingly, the air in the plenum 100 flows smoothly into the intake manifold 200 through the first guide passage 311 of the connecting part 310 tilted in accordance with a natural direction of the air flow. In addition thereto, the length of the runner 210 becomes short. Therefore, in the intake manifold 200, the air that passes through the guide passage 311 is mixed with the air that has passed through the connecting passage 120.

On the other hand, when the vehicle travel speed is low, the second passage 321 of the second connecting part 320 is opened, and the first passage 311 of the first connecting part 310 is closed. Therefore, the length of the runner 210 becomes long.

As has been explained, the variable intake system of a vehicle according to an embodiment of the present invention has a number of advantages. Since the guiding passages are tilted at a predetermined angle, a flow velocity and a flow pressure of air can be enhanced. In addition, according to an embodiment of the present invention, since only one of the driving shafts is disposed on one of the connecting parts, the system has an improved layout. All the advantages described in the specification are inclusive.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A variable intake system of a vehicle, comprising:
   a plenum configured to receive a flow of external air;
   an intake manifold connected to the plenum with a connecting passage and comprising a plurality of runners configured to guide the air of the plenum into a plurality of cylinders; and
   a varying unit controlling a length of the runners according to vehicle driving conditions, wherein the varying unit comprises:
   a first connecting part interconnecting the plenum and the intake manifold at an upper portion of the plenum, and having a first plurality of guide passages for distributing the air from the plenum to the intake manifold;
   a second connecting part interconnecting the plenum and the intake manifold at a lower portion of the plenum, and having a second plurality of guide passages for distributing the air from the plenum to the intake manifold;
   a first opening/closing part disposed on the first connecting part so as to selectively open/close the first plurality of guide passages; and
   a second opening/closing part disposed on the second connecting part so as to selectively open/close the second plurality of guide passages,
   wherein each of the first and second pluralities of guide passages is tilted at a predetermined angle.

2. The variable intake system of claim 1, wherein each of the first and second opening/closing parts comprises:
   a driving shaft pivotally disposed on the connecting part; and
   a plurality of valves disposed on the driving shaft so as to open/close the first and second plurality of guide passages, respectively.

3. The variable intake system of claim 1, wherein the predetermined angle of each of the guide passages is 24±1° with respect to a horizontal line of the plenum.

* * * * *